United States Patent [19]

Wicks et al.

[11] Patent Number: 5,733,967
[45] Date of Patent: *Mar. 31, 1998

[54] AQUEOUS POLYURETHANE DISPERSIONS AND THEIR USE FOR PREPARING COATINGS WITH EXCELLENT HYDROLYTIC AND THERMAL STABILITY

[75] Inventors: Douglas A. Wicks, Mt. Lebanon, Pa.; Arthur W. Mason, Sisterville, W. Va.; Philip E. Yeske; Lyuba K. Gindin, both of Pittsburgh, Pa.; Kenneth P. Yonek, McMurray, Pa.; Peter D. Schmitt, Glen Dale, W. Va.

[73] Assignee: Bayer Corporation, Pittsburgh, Pa.

[*] Notice: The term of this patent shall not extend beyond the expiration date of Pat. No. 5,652,301.

[21] Appl. No.: 704,416

[22] Filed: Aug. 20, 1996

[51] Int. Cl.$^6$ ................ C08J 3/00; C08K 3/20; C08L 75/00
[52] U.S. Cl. ................ 524/591; 524/539; 524/589; 524/590; 524/839; 524/840; 524/874
[58] Field of Search ................ 524/539, 591, 524/839, 840, 589, 590, 874

[56] References Cited

U.S. PATENT DOCUMENTS

| | | | |
|---|---|---|---|
| 3,479,310 | 11/1969 | Dieterich et al. | 260/29.2 |
| 3,676,455 | 7/1972 | Haug et al. | 260/309.5 |
| 3,870,684 | 3/1975 | Witt et al. | 260/75 NH |
| 4,066,591 | 1/1978 | Scriven et al. | 260/29.2 TN |
| 4,092,286 | 5/1978 | Noll et al. | 260/29.2 TN |
| 4,108,814 | 8/1978 | Reiff et al. | 260/29.2 TN |
| 4,203,883 | 5/1980 | Hangauer, Jr. | 260/29.2 TN |
| 4,237,264 | 12/1980 | Noll et al. | 528/67 |
| 4,238,378 | 12/1980 | Markusch et al. | 260/29.2 TN |
| 4,408,008 | 10/1983 | Markusch | 524/591 |
| 4,501,852 | 2/1985 | Markusch et al. | 524/591 |
| 4,701,480 | 10/1987 | Markusch et al. | 523/340 |
| 5,410,011 | 4/1995 | Konishi et al. | 528/73 |

*Primary Examiner*—Patrick D. Niland
*Attorney, Agent, or Firm*—Joseph C. Gil; Thomas W. Roy

[57] ABSTRACT

The present invention relates to aqueous dispersions of polyurethanes containing hydantoin groups (calculated as $C_3N_2O_2$, MW 96) in an amount of 1 to 40% by weight, based on resin solids. The present invention also relates to the use of these dispersions for preparing coatings with excellent hydrolytic and thermal stability.

6 Claims, No Drawings

5,733,967

AQUEOUS POLYURETHANE DISPERSIONS AND THEIR USE FOR PREPARING COATINGS WITH EXCELLENT HYDROLYTIC AND THERMAL STABILITY

BACKGROUND OF THE INVENTION

1. Field of the Invention

The present invention relates to aqueous polyurethane dispersions containing hydantoin groups and to their use for the production of coatings having excellent hydrolyric and thermal stability.

2. Description of the Prior Art

The production of linear or cross-linked aqueous polyurethane-urea dispersions is known as shown by U.S. Pat. Nos. 3,479,310; 4,066,591; 4,092,286; 4,108,814; 4,237,264; and 4,238,378 which disclose linear polyurethane-ureas and U.S. Pat. Nos. 3,870,684 4,203,883 and 4,408,008, which disclose cross-linked polyurethane-ureas. The polyurethane-urea dispersions are generally prepared by initially forming an NCO prepolymer by reacting a diisocyanate with a high molecular weight diol, such as a polyester, and with an anionic group-containing diol. The NCO prepolymer is then dispersed in water and chain extended with an amine chain extender to form the polyurethane-urea.

The aqueous polyurethane-urea dispersions may be used for a wide range of commercial applications such as adhesives or coatings for various substrates including textile fabrics, plastic, wood, glass fibers and metals. Chemical resistance, abrasion resistance, toughness, tensile strength, elasticity and durability are among the many desirable properties of these coatings. In some cases these properties of coatings prepared from aqueous polyurethane-urea dispersions have equaled or even surpassed the performance levels of coatings obtained from solvent-based polyurethane lacquers.

Regardless of the property level which may be obtained for coatings prepared from commercial polyurethane-urea dispersions, there is always a further need to increase these properties, in particular hydrolyric stability and thermal stability. Accordingly, it is an object of the present invention to improve these properties.

This object may be achieved with the aqueous polyurethane dispersions according to the present invention by replacing at least a portion of the polyols that have previously been used to prepare aqueous polyurethane-urea dispersions with hydroxy-functional prepolymers containing hydantoin groups or hydantoin group precursors.

Obtaining coatings with good hydrolytic stability has always been difficult because many of the commercially available polyurethane-urea dispersions are based on polyester polyols. The polyurethanes are rendered hydrophilic by tertiary amine-neutralized acid groups, generally carboxylic acid groups. When the dispersions are subsequently cured, the tertiary amines are released and the carboxylic acid is reformed. The acid then catalyzes the hydrolytic degradation of the polyester backbone.

There have been many attempts to prevent this hydrolytic degradation, e.g., by neutralizing the acid groups with alkali metals, such as sodium, that are not released during the formation of the coating (U.S. Pat. Nos. 4,501,852 and 4,701,480). However, the presence of salt groups causes the resulting coatings to swell in the presence of water. It has also been proposed to replace the polyester polyols with polycarbonate polyols, but these materials significantly add to the cost of the resulting polyurethane-urea dispersions.

SUMMARY OF THE INVENTION

The present invention relates to aqueous dispersions of polyurethanes containing hydantoin groups (calculated as $C_3N_2O_2$, MW 96) in an amount of 1 to 40% by weight, based on resin solids.

The present invention also relates to the use of these dispersions for preparing coatings with excellent hydrolyric and thermal stability.

DETAILED DESCRIPTION OF THE INVENTION

In accordance with the present invention the term "polyurethane" refers to polymers containing one or more urethane groups and optionally other groups such as urea groups. The term "aqueous polyurethane dispersions" refers to dispersions in which the polyurethanes remain stably dispersed, without sedimentation, due to the presence of chemically incorporated and/or external emulsifiers. The term "stable aqueous polyurethane dispersion" refers to dispersions in which the polyurethanes remain stably dispersed, without sedimentation, due to the presence of sufficient chemically incorporated and/or external emulsifiers. The term "aqueous polyurethane dispersions," in addition to referring to stable aqueous polyurethane dispersions, also refers to dispersions in which the polyurethanes sediment during storage, but can be redispersed prior to use. The term "hydantoin group precursor" means the reaction product of an isocyanate group with a particular secondary amino group, i.e., an aspartate, in which the reaction product can be converted into a hydantoin group, e.g., by heating.

The aqueous dispersions of polyurethanes according to the present invention contain hydantoin groups (calculated as $C_3N_2O_2$, MW 96) in an amount of 1 to 40% by weight, preferably 1 to 20% by weight and more preferably 3 to 20% by weight, based on resin solids.

In accordance with the present invention the aqueous polyurethane dispersions may be prepared by either a one-stage or a two-stage process, preferably a two-stage process, wherein an NCO prepolymer is formed in the first stage and is subsequently chain extended with an isocyanate-reactive component in the second stage either before, during or after being mixed with an aqueous medium. However, any of the known one- and two-stage processes and starting materials may be used for preparing the dispersions with the only requirement being that the starting materials for the preparation of the polyisocyanate addition product contain a hydroxy-functional prepolymer containing hydantoin groups or hydantoin group precursors. These hydroxy-functional prepolymers may be used in place of at least a portion of the high molecular polyols that are conventionally used to prepare the polyurethane dispersions known in the art.

Suitable polyisocyanates which may be used to prepare the polyureas are known and have a functionality of 1.8 to 6, preferably 2 to 6, more preferably 2 to 4 and most preferably 2. Examples of these polyisocyanates include monomeric polyisocyanates and polyisocyanate adducts, preferably monomeric diisocyanates represented by the formula $$R(NCO)_2$$

in which R represents an organic group obtained by removing the isocyanate groups from an organic diisocyanate having a molecular weight of from about 112 to 1,000, preferably from about 140 to 400. Diisocyanates preferred for the process according to the invention are those represented by the above formula in which R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6 to 15 carbon atoms. Examples of suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 1,3- and 1,4-bis-(isocyanatomethyl)-cyclohexane, bis-(4-isocyanatocyclohexyl)-methane, 2,4'-diisocyanato-dicyclohexyl methane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenylmethane diisocyanate and 1,5-diisocyanato naphthalene and mixtures thereof.

Polyisocyanates containing 3 or more isocyanate groups such as 4-isocyanatomethyl-1,8-octamethylene diisocyanate and aromatic polyisocyanates such as 4,4',4"-triphenylmethane triisocyanate and polyphenyl polymethylene polyisocyanates obtained by phosgenating aniline/formaldehyde condensates may also be used.

Preferred polyisocyanates are bis-(4-isocyanatocyclohexyl)methane, 1,6-hexamethylene diisocyanate and isophorone diisocyanate.

Suitable polyisocyanate adducts are those containing isocyanurate, uretdione, biuret, urethane, allophanate, carbodiimide and/or oxadiazine-trione groups. The polyisocyanates adducts have an average functionality of 2 to 6 and an NCO content of 5 to 30% by weight and are disclosed in copending applications, U.S. Ser. Nos. 08/444,321 and 08/443,502, the disclosures of which are herein incorporated by reference.

Preferred polyisocyanate adducts are the polyisocyanates containing isocyanurate groups, biuret groups and mixtures of isocyanurate groups with either allophanate or uretdione groups. Most preferably, monomeric polyisocyanates are used in accordance with the present invention instead of polyisocyanate adducts.

In accordance with the present invention hydantoin groups are incorporated into the polyurethanes by reacting the previously described polyisocyanates with hydroxy-functional prepolymers containing hydantoin groups or hydantoin group precursors. Also suitable are the isocyanate-terminated prepolymers containing hydantoin groups or hydantoin group precursors which may be prepared by reacting polyaspartates with an excess of monomeric polyisocyanates or polyisocyanate adducts, preferably monomeric diisocyanates (especially 1,6-hexamethylene diisocyanate). Examples of the hydroxy-functional prepolymers are described in copending applications, U.S. Ser. Nos. 08/444,321 and 08/443,502, which have previously been incorporated by reference.

Suitable polyaspartates that may be used as starting materials for the production of the isocyanate-terminated prepolymers containing hydantoin groups or hydantoin group precursors include those corresponding to the formula:

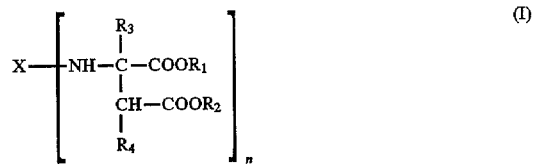

wherein

X represents an organic group which has a valency of n and is inert towards isocyanate groups at a temperature of 100° C. or less, preferably a hydrocarbon group obtained by removing the amino groups from an aliphatic, araliphatic or cycloaliphatic polyamine, more preferably a diamine, and $R_1$ and $R_2$ may be the same or different and represent organic groups which are inert towards isocyanate groups at a temperature of 100° C. or less, preferably alkyl groups containing 1 to 9 carbon atoms and more preferably methyl, ethyl or butyl groups, $R_3$ and $R_4$ may be same or different and represent hydrogen or organic groups which are inert towards isocyanate groups at a temperature of 100° C. or less, preferably hydrogen, and n has a value of at least 2, preferably 2 to 6, more preferably 2 to 4 and most preferably 2.

These polyaspartates may be prepared by reacting optionally substituted maleic or fumaric acid esters with polyamines. Suitable optionally substituted maleic or fumaric acid esters are those corresponding to the formula $$R_1OOC-CR_3=CR_4-COOR_2 \qquad (I)$$

wherein $R_1$, $R_2$, $R_3$ and $R_4$ are as defined above.

Examples of optionally substituted maleic or fumaric acid esters suitable for use in the preparation of the polyaspartates include dimethyl, diethyl and dibutyl (e.g., di-n-butyl) esters of maleic acid and fumaric acid and the corresponding maleic or fumaric acid esters substituted by methyl in the 2- and/or 3-position.

Suitable polyamines for preparing the polyaspartates include those corresponding to the formula $$X-(-NH_2)_n \qquad (II)$$

wherein X and n are as previously defined.

The polyamines include high molecular weight amines having molecular weights of 800 to about 10,000, preferably 800 to about 6,000, and low molecular weight amines having molecular weights below 800, preferably below 600. The molecular weights are number average molecular weights ($M_n$) and are determined by end group analysis (NH number). Examples of these polyamines are those wherein the amino groups are attached to aliphatic, cycloaliphatic, araliphatic and/or aromatic carbon atoms.

Suitable low molecular polyamines include ethylene diamine, 1,2-and 1,3-propane diamine, 2-methyl-1,2-propane diamine, 2,2-dimethyl-1,3-propane diamine, 1,3- and 1,4-butane diamine, 1,3- and 1,5-pentane diamine, 2-methyl-1,5-pentane diamine, 1,6-hexane diamine, 2,5-dimethyl-2,5-hexane diamine, 2,2,4- and/or 2,4,4-trimethyl-1,6-hexane diamine, 1,7-heptane diamine, 1,8-octane diamine, 1,9-nonane diamine, triaminononane, 1,10-decane diamine, 1,11-undecane diamine, 1,12-dodecane diamine, 1-amino-3-aminomethyl-3,5,5-trimethyl cyclohexane, 2,4- and/or 2,6-hexahydrotoluylene diamine, 2,4'- and/or 4,4'-diamino-dicyclohexylmethane, 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 1,3- and/or 1,4-cyclohexane diamine, 1,3-bis(methylamino)-cyclohexane, 1,8-p-menthane diamine, hydrazine, hydrazides of semicarbazido carboxylic acids, bis-hydrazides, bis-semicarbazides, phenylene diamine, 2,4- and 2,6-toluylene diamine, 2,3- and 3,4-toluylene diamine, 2,4'- and/or 4,4'-diaminodiphenyl methane, diethylene triamine, triethylene tetramine, tetraethylene pentamine, pentaethylene hexamine, N,N,N-tris-(2-amino-ethyl)-amine, N,N,N'-tris-(2-aminoethyl)-ethylene diamine, N-(2-amino-ethyl)-1,3-propane diamine, polyoxypropylene amines, tetrapropylene-pentamine, tripropylenetetramine, N,N-bis-(6-amino-hexyl)amine, N,N'-bis-(3-aminopropyl)-ethylene diamine, 2,4-bis-(4'-aminobenzyl)-aniline, higher functional polyphenylene polymethylene polyamines obtained by the aniline/formaldehyde condensation reaction, N,N,N-tris-(2-amino-ethyl)-amine, guanidine, melamine, N-(2-aminoethyl)-1,3-propane diamine, 3,3'-diamino-benzidine, polyoxypropylene amines, polyoxy-ethylene amines, 2,4-bis-(4'-aminobenzyl)-aniline and mixtures thereof. Also suitable are amine-terminated polyethers having the required molecular weight such as the Jeffamine resins, e.g., Jeffamine D-230 and T-403, available from Huntsman.

Suitable high molecular weight polyamines include those prepared from the known polyhydroxyl compounds of polyurethane, especially the polyethers. The polyamines may be prepared by reacting the polyhydroxyl compounds with an excess of the previously described polyisocyanates to form NCO prepolymers and subsequently hydrolyzing the terminal isocyanate group to an amino group. Preferably, the polyamines are prepared by converting the terminal hydroxy groups of the polyhydroxyl compounds to amino groups, e.g., by amination. Preferred high molecular weight polyamines are amine-terminated polyethers such as the Jeffamine resins available from Huntsman.

Preferred polyamines are 1-amino-3-aminomethyl-3,5,5-trimethyl-cyclohexane (isophorone diamine or IPDA), bis-(4-aminocyclo-hexyl)-methane, bis-(4-amino-3-methylcyclohexyl)-methane, 1,6-diamino-hexane, 2-methyl pentamethylene diamine, ethylene diamine, triaminononane, 2,4- and/or 2,6-toluylene diamine, 4,4'- and/or 2,4'-diaminodiphenyl methane and the Jeffamine D-230 and T-403 resins.

The preparation of the polyaspartates from the above mentioned starting materials may be carried out, for example, at a temperature of 0° to 100° C. using the starting materials in such proportions that at least 1, preferably 1, olefinic double bond is present for each primary amino group. Excess starting materials may be removed by distillation after the reaction. The reaction may be carried out solvent-free or in the presence of suitable solvents such as methanol, ethanol, propanol, tetrahydrofuran, dioxane and mixtures of such solvents.

The isocyanate-terminated prepolymers containing hydantoin group precursors are prepared by reacted the polyisocyanates with the polyaspartates at a maximum equivalent ratio of isocyanate groups to aspartate groups (i.e., secondary amino groups) of 10:1, preferably 5:1 and more preferably 3:1 and a minimum equivalent ratio of isocyanate groups to aspartate groups (i.e., secondary amino groups) of 1.05:1, preferably 1.2:1 and more preferably 1.4:1.

The reaction is preferably carried out by incrementally adding the polyaspartate to the polyisocyanate. The reaction to form the urea group-containing intermediate is conducted at a temperature of 10° to 100° C., preferably 20° to 80° C. and more preferably 20° to 50° C. After this addition reaction is complete the resulting NCO prepolymers contain hydantoin group precursors, i.e., urea groups, and may be used in this form for the preparation of the hydroxy-functional prepolymers containing hydantoin groups or hydantoin group precursors.

While the NCO prepolymers containing hydantoin group precursors may be converted to NCO prepolymers containing hydantoin groups, it is not preferred to convert the urea groups to hydantoin groups at this time. This is because the subsequent reaction to form the hydroxy-functional prepolymers will also introduce urea groups into the product, and it is preferred for economic reasons to convert all of the urea groups to hydantoin groups at the same time.

In addition, the monoalcohol given off when the urea groups are converted to hydantoin groups can react with the isocyanate groups of the NCO prepolymer to form blocked isocyanate groups. In this form the NCO prepolymer cannot be reacted with the hydroxy aspartates to form the hydroxy-functional polyhydantoin prepolymers according to the invention. If it is desired to convert the urea groups to hydantoin groups before the formation of the hydroxy-functional polyhydantoin prepolymers, the reaction must take place at temperatures above the deblocking temperature of the isocyanate groups to prevent the formation of blocked isocyanate groups.

Suitable hydroxy aspartates that may be used as starting materials for the production of the hydroxy-functional prepolymers containing hydantoin groups or hydantoin group precursors are prepared by reacting optionally substituted maleic or fumaric acid esters with amino alcohols. Suitable and preferred optionally substituted maleic or fumaric acid esters are those previously set forth the production of the polyaspartates which correspond to formula I).

Suitable amino alcohols for preparing the hydroxy aspartates are those containing one primary amino group and 1 to 3, and preferably 1 hydroxy group, provided that the hydroxy group(s) are aliphatically (including araliphatically) or cycloaliphatically bound. These amino alcohols correspond to the formula

$$NH_2—R_5—(OH)_n \qquad (III)$$

wherein

R$_5$ represents the hydrocarbon radical obtained by removing the amino and hydroxyl groups from an amino alcohol and n has a value of 1 to 3, preferably 1.

Suitable amino alcohols include ethanolamine, 1-amino-2-hydroxypropane, 1-amino-3-hydroxypropane, 1-hydroxy-2-aminopropane and 1,3-propanolamine, the isomeric butanol amines, 2-amino-1,3-propane diol and 2-amino-2-hydroxymethyl-propane diol. The mono-hydroxy amines are preferred, especially ethanolamine and the isomeric propanol and butanol amines.

The preparation of hydroxy aspartates takes place by the Michael addition of the amino alcohol to the unsaturated diester at a temperature of 0° to 100° C. using the starting materials in such proportions that at least 1, preferably 1, olefinic double bond is present for each amino group. Excess starting materials may be removed by distillation after the reaction. The reaction may be carried out solvent-free or in the presence of suitable solvents such as methanol, ethanol, propanol, dioxane, tetrahydrofuran, pyridine, dimethyl formamide, nitromethane and mixtures of such solvents.

The hydroxy-functional prepolymers containing hydantoin groups or hydantoin group precursors are prepared by reacting the polyisocyanates with the hydroxy aspartates in an amount such that one mole of the hydroxy aspartate (i.e., one equivalent of secondary amino groups) is present for each equivalent of isocyanate groups. While excess amounts of either component may be used, no particular advantages are obtained. Excess hydroxy aspartate is capable of reacting with isocyanate groups in a subsequent curing step. Excess isocyanate will react with the hydroxy-functional prepolymers according to the invention resulting in a partial chain extension reaction.

The reaction is preferably carried out by incrementally adding the polyisocyanate to the hydroxy aspartate. The reaction to form the urea group-containing intermediate is conducted at a temperature of 10° to 100° C., preferably 20° to 80° C. and more preferably 20° to 50° C.

After the addition reaction to form the prepolymers is complete, the hydantoin group precursors may be converted to hydantoin groups by increasing the temperature to 60° to 240° C., preferably 80° to 160° C. and more preferably 100° to 140° C. It is also possible to form the hydantoin group at a later stage in the process. Instead of forming the urea groups and hydantoin groups in two steps, the reaction to form the prepolymers may be carried out entirely at elevated temperatures in order to form the urea groups and hydantoin groups in one step.

The formation of the hydroxy-functional polyhydantoin prepolymers may be represented by the following reaction scheme:

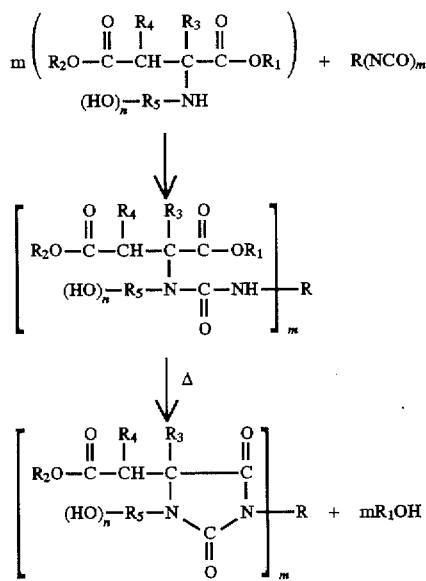

In an alternative embodiment for the preparation of the hydroxy-functional polyhydantoin prepolymers, the polyaspartates and the hydroxy aspartates are blended and then reacted with the polyisocyanate component. The aspartate groups react with the isocyanate groups in preference to the hydroxy groups such that the hydroxy groups are present in terminal positions. In accordance with this embodiment the NCO prepolymers containing hydantoin group precursors are formed in situ during the formation of the hydroxy-functional polyhydantoin prepolymers. The amounts of the polyaspartates and hydroxy aspartates are selected in the same manner as in the two-step process such that they satisfy the guidelines previously set forth, i.e., there should be an excess of isocyanate groups to aspartate groups of the polyaspartate and there should preferably be one mole of the hydroxy aspartate for each equivalent of excess isocyanate such that the total equivalents of isocyanate groups to aspartate groups is preferably about 1:1. To form the hydroxy-functional polyhydantoin prepolymer, the urea group-containing intermediate may be heated as previously set forth to form the corresponding hydantoin groups.

Instead of exclusively using hydroxy-functional prepolymers containing hydantoin groups or hydantoin group precursors as the high molecular weight component for preparing the polyurethanes according to the present invention, it is also possible to use blends of these prepolymers with the known organic compounds containing at least two isocyanate-reactive groups, preferably hydroxy groups, i.e., high molecular weight compounds having molecular weights of 400 to 6,000, preferably 800 to 3,000. The molecular weights are number average molecular weights ($M_n$) and are determined by end group analysis (OH number). Examples of these high molecular weight compounds include polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred. Further details concerning these high molecular weight compounds and starting materials for their preparation are disclosed in U.S. Pat. No. 4,701,480, herein incorporated by reference.

While the presence of the previously described high molecular weight polyols is optional, they may preferably be used in amount of at least 5%, more preferably at least 10% by weight, based on the weight of the polyisocyanate addition product. The maximum amount of these polyols is preferably 85%, more preferably 75% by weight, based on the weight of the polyisocyanate addition product.

Low molecular weight isocyanate-reactive compounds, which may optionally be used to prepare the polyurethanes and which have an average molecular weight of up to 400, include the polyhydric alcohols, preferably dihydric alcohols that have previously been incorporated by reference for preparing the polyester and polyether polyols. Also suitable are aldimines prepared by reacting the amines, which have previously been described for preparing the polyaspartates, with aldehydes such as isobutyraldehyde.

In addition to the above-mentioned components which are preferably difunctional in the isocyanate polyaddition reaction, mono-functional and even small portions of tri-functional and higher functional components generally known in polyurethane chemistry, such as trimethylolpropane, may be used in special cases in which slight branching of the NCO prepolymer or polyurethane is desired. However, the NCO prepolymers should be substantially linear and this may be achieved by maintaining the average functionality of the prepolymer starting components below about 2.1.

In order to enable the polyurethanes to be stably dispersed in an aqueous medium, ionic or potential ionic groups and/or lateral or terminal, hydrophilic ethylene oxide units may be chemically incorporated into the polyurethanes. The ionic or potential ionic groups may be either anionic or cationic, preferably anionic. Examples of anionic groups include carboxylate and sulfonate groups, while examples of cationic groups include ammonium and sulfonium groups. The ionic groups are incorporated in an amount sufficient to provide an ionic group content of 0 to 200 milliequivalents per 100 g of polyurethane. When the ionic or potential ionic groups are incorporated, they are preferably incorporated in an amount sufficient to provide an ionic group content of at least 10, preferably at least 20 milliequivalents per 100 g of polyurethane. The upper limit for the content of ionic groups is preferably 180, more preferably 100 milliequivalents per 100 g of polyurethane.

The content of hydrophilic ethylene oxide units may be up to about 10%, preferably up to about 8%, more preferably about 1 to 6% and most preferably about 1 to 5%, by weight, based on the weight of the polyurethane. Instead of or, in addition to, the chemically incorporated ionic and/or nonionic hydrophilic groups, it is also possible to provide hydrophilicity to the polyurethanes by blending them with known nonionic, external emulsifiers, e.g., the alkaryl types such as polyoxyethylene nonyl phenyl ether or polyoxyethylene octyl phenyl ether; the alkyl ether types such as polyoxyethylene lauryl ether or polyoxyethylene oleyl ether; the alkyl ester types such as polyoxyethylene laurate, polyoxyethylene oleate or polyoxyethylene stearate; and the polyoxyethylene benzylated phenyl ether types.

The ionic or potential ionic groups may be chemically incorporated into the NCO prepolymer or may be chemically incorporated through the chain extender which is used to form the polyurethane from the prepolymer. Suitable compounds for incorporating these groups include i) monoisocyanates or diisocyanates which contain ionic or potential ionic groups and ii) compounds which are monofunctional or difunctional in the isocyanate-polyaddition reaction and contain ionic or potential ionic groups.

The ionic groups are formed by neutralizing the corresponding potential ionic groups either prior to, during or after formation of the polyisocyanate addition product. When the potential ionic groups are neutralized prior to their incorporation into the polyisocyanate addition product, the ionic groups are incorporated directly. When neutralization is performed subsequent to forming the NCO prepolymer or polyurethane, potential ionic groups are incorporated.

Suitable compounds for incorporating the carboxylate, sulfonate and quaternary nitrogen groups are described in U.S. Pat. Nos. 3,479,310, 4,108,814 and 4,303,774, the disclosures of which are herein incorporated by reference. Suitable compounds for incorporating tertiary sulfonium groups are described in U.S. Pat. No. 3,419,533, also incorporated by reference. The preferred sulfonate groups for incorporation into the NCO prepolymer are the diol sulfonic acids or the diol sulfonates disclosed in U.S. Pat. No. 4,108,814.

The neutralizing agents for converting the potential ionic groups to ionic groups are described in the preceding U.S. patents and are also discussed hereinafter. Within the context of this invention, the term "neutralizing agents" is meant to embrace all types of agents which are useful for converting potential ionic groups to ionic groups.

The preferred carboxylate groups for incorporation into polyurethane in either the one-stage or two-stage process are derived from hydroxy-carboxylic acids corresponding to the formula:

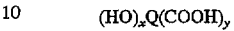

(HO)$_x$Q(COOH)$_y$ wherein

Q represents a straight or branched, hydrocarbon radical containing 1 to 12 carbon atoms, and x and y represent values from 1 to 3.

Examples of these hydroxy-carboxylic acids include citric acid and tartaric acid.

The preferred acids are those of the above-mentioned formula wherein x=2 and y=1. These dihydroxy alkanoic acids are described in U.S. Pat. No. 3,412,054, herein incorporated by reference. The preferred group of dihydroxy alkanoic acids are the α,α-dimethylol alkanoic acids represented by the structural formula

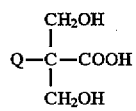

$$Q-\underset{\underset{CH_2OH}{|}}{\overset{\overset{CH_2OH}{|}}{C}}-COOH$$

wherein Q' is hydrogen or an alkyl group containing 1 to 8 carbon atoms. The most preferred compound is α,α-dimethylol propionic acid, i.e., when Q' is methyl in the above formula.

When incorporating the anionic or potential anionic groups through the chain extender used to convert the NCO prepolymer to the polyurethane in the second stage of the two-stage process, i.e., after the prepolymer has been disclosed in water, it is preferred to use amino functional compounds containing anionic or potential anionic groups such as the diamino carboxylic acids or carboxylates disclosed in U.S. Pat. No. 3,539,483 or salts of 2,6-diaminohexanoic acid. When sulfonate groups are desired they may be incorporated through the chain extenders using salts of isethionic acid or preferably diamino sulfonates of the formula

H$_2$N—A—NH—B—SO$_3$— wherein

A and B represent aliphatic hydrocarbon radicals containing 2 to 6 carbon atoms, preferably ethylene groups.

Whether the anionic groups are incorporated into the polyurethane via the prepolymer or the chain extender is not critical. Therefore, the anionic groups may exclusively be incorporated via the prepolymer or via the chain extender or a portion of the anionic groups may be introduced according to each alternative. However, it is preferred to introduce the anionic groups via the prepolymer since this allows a wider range of process variations in preparing the aqueous polyurethane dispersion.

Suitable compounds for incorporating the lateral or terminal, hydrophilic ethylene oxide units may be either monofunctional or difunctional in the context of the isocyanate-polyaddition reaction and include i) diisocyanates which contain lateral, hydrophilic ethylene oxide units, ii) compounds which are difunctional in the isocyanate-polyaddition reaction and contain lateral, hydrophilic ethylene oxide units, iii) monoisocyanates which contain terminal, hydrophilic ethylene oxide units, iv) compounds which are monofunctional in the isocyanate-polyaddition reaction and contain terminal, hydrophilic ethylene oxide units, and v) mixtures thereof.

Examples of these compounds are disclosed in U.S. Pat. Nos. 3,905,929, 3,920,598 and 4,190,566 (the disclosures of which are herein incorporated by reference). Preferred hydrophilic components are the monohydroxy polyethers having terminal hydrophilic chains containing ethylene oxide units. These hydrophilic components may be produced as described in the preceding patents by alkoxylating a monofunctional starter, such as methanol or n-butanol, using ethylene oxide and optionally another alkylene oxide, for example propylene oxide.

The NCO prepolymers of the present invention are prepared by reacting the polyisocyanate component with the hydroxy-functional prepolymer containing hydantoin groups or hydantoin group precursors, preferably hydantoin groups, and optionally any other high or low molecular weight organic component containing at least 2 isocyanate-reactive groups. Optional low molecular weight components include the component containing at least one ionic group or at least one potential ionic group and the component containing hydrophilic ethylene oxide units. The isocyanate-reactive components may be reacted with the polyisocyanate component either in admixture and/or sequentially to produce the NCO prepolymer. The ratio of isocyanate groups to isocyanate-reactive groups is maintained between about 1.1 to 5, preferably about 1.2 to 3 and most preferably about 1.3 to 2.0 on an equivalent basis. The above components may be reacted simultaneously or sequentially to produce the NCO prepolymer.

Any hydantoin group precursors that have not been converted to hydantoin groups can react to form hydantoin groups during the formation of the NCO prepolymers and after the prepolymers are added to water. If precautions are not taken, the monoalcohol released as a byproduct can react with the terminal isocyanate groups of the NCO prepolymers resulting in chain termination. Chain termination is more likely to occur during the formation of the NCO prepolymers, especially in the presence of acids, which are known to catalyze the formation of hydantoin groups.

To reduce the likelihood of hydantoin formation and chain termination during the preparation of the NCO prepolymer, it is preferred to neutralize any potential anionic groups (that are present to provide hydrophilicity to the dispersed polyurea) before the aspartate-functional prepolymer is reacted with isocyanate groups. This can be accomplished by reacting the polyisocyanate component with the isocyanate-reactive component containing potential anionic groups and neutralizing the acid groups before the addition of the aspartate-functional hydantoin prepolymer.

The reaction temperature during prepolymer production is normally maintained below about 150° C., preferably between about 50° and 130° C. The reaction is continued until the content of unreacted isocyanate groups decreases to the theoretical amount or slightly below. The finished prepolymer should have a free isocyanate content of about 1 to 20%, preferably about 1 to 10% by weight, based on the weight of prepolymer solids.

The prepolymers may be prepared in the presence of solvent, provided that the solvent is substantially nonreactive in the context of the isocyanate-polyaddition reaction. Examples of suitable solvents include dimethylformamide, esters, ethers, ketoesters, ketones, e.g., methyl ethyl ketone and acetone, glycol-ether-esters, chlorinated hydrocarbons, aliphatic and alicyclic hydrocarbon-substituted pyrrolidinones, e.g., N-methyl-2-pyrrolidinone, hydrogenated furans, aromatic hydrocarbons and mixtures thereof.

Suitable neutralizing or quaternizing agents for converting the potential anionic groups to anionic groups either before, during or after their incorporation into the polyurethanes, are tertiary amines, alkali metal cations or ammonia. Examples of these neutralizing agents are disclosed in U.S. Pat. Nos. 4,501,852 and 4,701,480, which are incorporated by reference. Preferred neutralizing agents are the trialkyl-substituted tertiary amines and include triethyl amine, N,N-dimethyl-ethanol amine, triethanol amine, N-methyl-diethanol amine, 2-aminomethyl-1-propanol, and N-methyl and N-ethyl morpholine.

A sufficient amount of the potential ionic groups, if present, must be neutralized so that when combined with the hydrophilic ethylene oxide units and external emulsifiers, the polyurethane will remain stably dispersed in the aqueous dispersion. Generally, at least about 75%, preferably at least about 90%, of the potential ionic groups are neutralized to the corresponding ionic groups. The conversion of the potential ionic groups to ionic groups is conducted in known manner, e.g., as described in the preceding patents setting forth suitable neutralizing agents.

The NCO prepolymers may be converted into aqueous polyurethane dispersions in accordance with the methods known in polyurethane chemistry and described, e.g., in "Waterborne Polyurethanes," Rosthauser et al, Advances in Urethane Science and Technology, Vol. 10, pg. 121–162 (1987).

According to one process for preparing the aqueous polyurethane dispersions, the NCO prepolymer is prepared, chain extended to form a polyurethane and subsequently dispersed in water. This process is disclosed in U.S. Pat. No. 3,479,310, herein incorporated by reference. If hydantoin groups or hydantoin group precursors are incorporated into the polyurethanes during the chain extension step, it is preferred to prepare the aqueous polyurethane dispersions in this manner.

However, since amines are preferably used as the chain extender, the preferred method of preparing the polyurethanes is to disperse the NCO prepolymer in water prior to chain extension. Whether dispersions of linear or cross-linked polyurethanes are obtained generally depends on the functionality of the chain extender.

The aqueous polyurethane dispersions of the present invention are preferably formed by reacting the NCO prepolymers with a polyamine or mixtures thereof in accordance with the previously described processes. The average functionality of the amine, i.e., the number of amine nitrogens per molecule, should be between about 2 and 6, preferably between about 2 and 4 and most preferably between about 2 and 3. The desired functionalities can be obtained by using mixtures of polyamines.

Suitable amines are essentially hydrocarbon polyamines containing 2 to 6 amino groups which have isocyanate-reactive hydrogens according to the Zerewitinoff test, e.g., primary or secondary amine groups. The polyamines are generally aromatic, aliphatic or alicyclic amines and preferably contain about 1 to 30 carbon atoms, more preferably about 2 to 15 carbon atoms, and most preferably about 2 to 10 carbon atoms. These polyamines may contain additional substitutents provided that they are not as reactive with isocyanate groups as the primary or secondary amines. When conducting the chain extension reaction after the NCO prepolymers have been dispersed in water, it is preferred that the amines are water soluble.

Examples of polyamines for use in the present invention include aliamines that have previously been disclosed as being suitable for the preparation of the polyaspartates. Preferred polyamines are 1-amino-3-aminomethyl-3,5,5-trimethyl-cyclohexane (isophorone diamine or IPDA), bis-(4-amino-cyclohexyl)-methane, bis-(4-amino-3-methylcyclohexyl)-methane, 1,6-diaminohexane, ethylene diamine, diethylene triamine, triethylene tetramine, tetraethylene pentamine, pentaethylene hexamine, hydrazine and amine-terminated polyethers such as the previously mentioned Jeffamine resins.

The amount of chain extender to be used in accordance with the present invention is dependent upon the number of terminal isocyanate groups in the prepolymer. Generally, the ratio of terminal isocyanate groups of the prepolymer to isocyanate-reactive groups of the chain extender, preferably the amino hydrogens of the polyfunctional amine, is between about 1.0:0.6 and 1.0:1.1, preferably between about 1.0:0.8 and 1.0:0.98 on an equivalent basis.

The reaction between the NCO prepolymer and the chain extender is generally conducted at temperatures of about 5° to 90° C., preferably from about 20° to 70° C., and most preferably from about 30° to 60° C. The reaction conditions are normally maintained until the isocyanate groups are essentially completely reacted.

The final product is a stable, aqueous polyurethane dispersion having a solids content of up to about 60% by weight, preferably about 15–60% by weight and most preferably about 30–45% by weight. However, it is always possible to dilute the dispersions to any minimum solids content desired. The particle size is generally below about 1.0 micron, and preferably about 0.001 to 0.5 microns. The average particle size is generally less than about 0.5 micron, preferably 0.01 to 0.3 microns. The small particle size enhances the stability of the dispersed particles and also leads to the production of films with high surface gloss.

The dispersions may be blended with other dispersions or with other known additives such as fillers, plasticizers, pigments, carbon black, silica sols and the known levelling agents, wetting agents, antifoaming agents and stabilizers.

The aqueous polyurethane dispersions are suitable for coating and impregnating woven and nonwoven textiles, leather, paper, wood, metals, ceramics, stone, concrete, bitumen, hard fibers, straw, glass, porcelain, plastics of a variety of different types, glass fibers for antistatic and crease-resistant finishing; as binders for nonwovens, adhesives, adhesion promoters, laminating agents, hydrophobizing agents, plasticizers; as binders, for example, for cork powder or sawdust, glass fibers, asbestos, paper-like materials, plastics or rubber waste, ceramic materials; as auxiliaries in textile printing and in the paper industry; as additives to polymers as sizing agents, for example, for glass fibers; and for finishing leather.

Drying of the products obtained by various application techniques may be carried out either at room temperature or at elevated temperature.

In the following examples all parts and percentages are by weight unless otherwise specified.

EXAMPLES

Preparation of hydroxy-functional aspartate A 228.29 g (1 mole) of dibutylmaleate were charged into a flask under nitrogen and then 61.08 g (1 mole) of ethanol amine were added dropwise into the flask. The temperature was maintained below 25° C. throughout the addition and subsequent reaction. The reaction was stopped after 7 hours. The resulting product was a clear, colorless liquid having a viscosity of about 42 mPa·s (25° C.) and a theoretical equivalent weight of 289.4 g/eq.

Preparation of hydroxy-functional aspartate B 228.29 g (1 mole) of dibutylmaleate were charged into a flask under nitrogen and then 75.1 g (1 mole) of propanol amine were added dropwise into the flask. The temperature was maintained below 25° C. throughout the addition and subsequent reaction. The reaction was stopped after 7 hours. The resulting product was a clear, colorless liquid having a viscosity of about 46 mPa·s (25° C.) and a theoretical equivalent weight of about 303.4 g/eq.

Preparation of bis-aspartates

The bis-aspartates set forth in the following table were prepared by adding dropwise 1 mole of a diamine with stirring to 2 moles of maleic acid dibutylester that was previously charged at ambient temperature to a 3-neck flask equipped with a stirrer, thermometer, nitrogen bubbler and an addition funnel. The amine was added at a rate such that the exotherm did not increase the temperature of the reaction mixture above 50° C. Upon complete addition, the contents of the reaction flask were maintained at 50° C. for a period of 12 hours.

The following table sets for the amounts of the reactants and the properties of the resulting bis-aspartates.

TABLE 1

| Example | A | B | C | D |
|---|---|---|---|---|
| Diamine/ | MPDA | TMHDA | HDA | $C_{36}$ Diamine |
| Amount | 116.00 | 158.30 | 116.22 | 530.00 |
| Dibutyl-maleate | 456.60 | 456.60 | 456.60 | 456.60 |
| Viscosity[1] | 64.00 | 88.00 | 69.00 | 310.00 |
| Amine Number (measured) | 192.10 | 182.00 | 198.00 | 114.06 |

[1] All viscosities were measured using Brookfield Model DV-II + viscometer equipped with a CP-40 spindle at 25° C.
MPDA — 2-methyl-1,5-pentane diamine.
TMDHA — trimethylhexamethylene diamine.
HDA — 1,6-hexamethylene diamine.
$C_{36}$ Diamine — Versamine 552, a liquid diamine with a 36 carbon backbone, available from Henkel.

Preparation of hydroxy-functional polyhydantoin prepolymers 1,6-hexamethylene diisocyanate (HDI) was charged into a flask under a nitrogen atmosphere and then the bis-aspartate was added dropwise to 1,6-hexamethylene diisocyanate while maintaining the temperature below 70° C. The reaction mixture was then heated at 70° C. for 2 hours. After that the hydroxy-functional aspartate was added to the reaction mixture in an amount sufficient to react with the residual isocyanate groups. The mixture was heated at 70° C. for another hour or until the isocyanate band disappeared from the IR spectrum, whichever is longer.

After completion of urea formation, acetic acid was added as a catalyst in the amount of 5000 ppm. The reaction mixture was then heated to 120° C. for 2–3 hours or until IR spectrum showed the disappearance of amide I and II bands and appearance of split ester carbonyl peak as an indication of a planar hydantoin ring, whichever is longer. After hydantoin formation was complete, the alcohol was distilled off under vacuum. The following able sets forth the amount of the reactants and the properties of the resulting hydroxy-functional polyhydantoin prepolymers.

groups were neutralized with triethylamine (TEA). After addition of the neutralizer, the mixture was stirred for approximately five minutes.

TABLE 2

| Hydantoin Prepolymer | 1 | 2 | 3 | 4 | 5 | 6 | 7 | 8 | 9 | 10 |
|---|---|---|---|---|---|---|---|---|---|---|
| Prepolymer Isocyanate amount | 220.97 | 243.6 | 226.8 | 226.8 | 310.56 | 329.11 | 284.02 | 329.11 | 177.07 | 212.48 |
| Bis-aspartate/ amount | C 453.33 | C 548.34 | C 490.62 | C 490.62 | C 683.64 | C 727.52 | A 658.31 | C 727.52 | B 385.30 | C + D 359.83 + 119 |
| OH-functional aspartate/ amount | A 336.53 | A 331.4 | A 344.2 | A 344.2 | B 400.01 | B 443.37 | B 357.67 | B 443.37 | A 278.85 | A 371.52 |
| NH/NCO | 1:1 | 1:1 | 1:1 | 1:1 | 1:1 | 1:1 | 1:1 | 1:1 | 1:1 | 1:1 |
| Hydroxyl Number (measured) | 68.86 | 48.15 | 74.5 | 76.8 | 61.7 | 67.7 | 61.5 | 65.7 | 66.41 | 81.28 |
| Equivalent weight | 815 | 1165 | 753 | 730 | 909 | 829 | 912 | 854 | 844.8 | 690.21 |
| Viscosity, mPa · s (Temp) | | 18,680 (70° C.) | 12,070 (70° C.) | 8634 (70° C.) | | 3500 (75° C.) | 7058 (75° C.) | 3755 (75° C.) | | |

Preparation of aqueously dispersed polyurethane containing hydantoin groups

Step 1—Preparation of NCO prepolymer

Dimethylolpropionic acid (DMPA, eq. wt. 307), a polyether monohydric alcohol [prepared from n-butanol, ethylene oxide, and propylene oxide (in a molar ratio ethylene oxide to propylene oxide of 83:17), eq. wt. 2124], a sulfonate diol [prepared from 1 mole of NaHSO$_3$ and 1 mole of propoxylated (3.8 moles of propylene oxide) butene-2-diol-(1,4), eq. wt. 307], N-methyl-pyrrolidone (NMP), isophorone diisocyanate (IPDI, eq. wt. 111.1), 1,6-hexamethylene diisocyanate (HDI, eq. wt. 84) and bis-(4-isocyanatocyclohexyl)-methane (H$_{12}$MDI, eq. wt. 131.2) in the amounts specified in the following table were added to a 1000 ml three neck flask equipped with stirrer, thermometer, and condenser and reacted at 90°–100° C. for three hours. When the NCO content was constant, the prepolymer was cooled to 75°–80° C. The carboxylic acid

TABLE 3

| Ingredients | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Hydantoin Prepolymer/ Amount | 1/ 233.8 | 2/ 334.4 | 3/ 216.1 | 4/ 209.7 | 5/ 260.9 | 5/ 276 | 6/ 239.8 | 7/ 261.8 | 8/ 245 | 9/ 195.5 | 10/ 198.1 |
| Sulfonate Diol | | | | | | 30 | | | | | |
| DMPA | 11.8 | 11.8 | 11.8 | 11.8 | 11.8 | | 13 | 14 | 15 | 11.1 | 11.8 |
| Monohydroxy polyether | 13.1 | 13.1 | 13.1 | 13.1 | 13.1 | 18 | 13.1 | 13.1 | 13.1 | 13.1 | 13.1 |
| NMP | 60 | 65 | 65 | 65 | 65 | 60 | 50 | 50 | 50 | 40.5 | 41.0 |
| IPDI | 15.6 | 56.3 | 56.3 | 56.3 | 56.3 | 52.3 | 16.2 | 16.7 | 17.2 | 15.6 | 15.6 |
| HDI | | 28.4 | 28.4 | 28.4 | 25.4 | 26.4 | | | | | |
| H$_{12}$MDI | 92.4 | | | | | | 95.9 | 98.9 | 101.8 | 92.4 | 92.4 |
| Triethylamine | 8.9 | 8.9 | 8.9 | 8.9 | 8.9 | | 9.8 | 10.6 | 11.3 | 8.7 | 8.7 |

Step 2—Dispersion and Chain Extension

The neutralized prepolymer was added slowly to the demineralized dispersing water at 50° C. under rapid agitation in a second flask (2000 ml resin flask). After the dispersion step was complete, the dispersed prepolymer was chain extended by the slow addition of one or more of the following amine chain extenders in water:hydrazine hydrate (64% in water, eq. wt. 25), diethylenetriamine (eq. wt. 34.3), an amine-terminated polyether (available from Huntsman as Jeffamine D400, eq. wt. 200) and ethylene diamine (eq. wt. 30). After the addition of the chain extenders, the dispersions were post reacted for 2 hours at 60°–70° C. The resulting aqueous polyurea dispersions had the properties listed in the following table.

TABLE 4

| Ingredient | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Dispersing Water | 451 | 560 | 387 | 378 | 454 | 491 | 464 | 506 | 486.8 | 300 | 400 |
| Hydrazine hydrate | 3.7 | 4.5 | 4 | 4 | 5 | 5 | 3.7 | 3.7 | 3.7 | 3.6 | 3.8 |
| Diethylene triamine | 3.3 | | | | | | 3 | 3 | 3 | 3.2 | 3.5 |
| Amine-terminated polyether | | 8.5 | 8 | 8 | 10 | 10 | | | | | |
| Water | 50 | 50 | 50 | 50 | 50 | 50 | 50 | 50 | 50 | 50 | 50 |
| Total Solids (%) | 40 | 40 | 40 | 35 | 40 | 38.5 | 40 | 40 | 40 | 40 | 40 |
| pH | 7.9 | 6.9 | 7.5 | 8 | 8.2 | 8.2 | 7 | 7.4 | 7.2 | 8.1 | 8.2 |
| Viscosity (mPas) @ 25° C. | 70 | 45 | 100 | 760 | 375 | 260 | 18 | 41 | 22 | 220 | 80 |
| Particle Size | | 139 | 130 | 133 | | | 158 | 112 | 115 | 112 | 115 |

Films were prepared from the aqueous polyurethane dispersions of Examples 3, 5 and 6 by blending them with 0.5% by weight of a levelling agent (Fluorad FC 430, available from 3M) and drawing them down onto glass at a wet film thickness of 10 mil. The coatings were cured for 24 hours at room temperature, then for 1 hour at 60° C., and finally for 4 more days at room temperature before they were removed tested. The tensile and elongation properties are set forth in the following table.

The film used in the comparison example was prepared from a commercial aqueous polyurethane dispersion, i.e., Bayhydrol 110, available from Bayer Corp. This polyurethane dispersion, which has a solids content of 40%, a pH of 7.9, a viscosity of 150 at 25° C. and a particle size of 100 nm, corresponds to those prepared in accordance with the present invention except that it is based on a polyester polyol instead of a hydroxy-functional prepolymer and, thus, does not contain hydantoin groups.

TABLE 5

| Test/Properties | Comp. Ex. | Ex. 3 | Ex. 5 | Ex. 6 |
|---|---|---|---|---|
| Initial elongation | 160 | 196 | 281 | 331 |
| Initial tensile strength (psi) | 5075 | 2587 | 2523 | 2048 |
| Elong. after 1 wk. at 95% RH, 70° C. | film destroyed | | | 229 |
| Tensile after 1 wk. at 95% RH, 70° C. | film destroyed | | | 1898 |
| Elong. after 2 wks. at 95% RH, 70° C. | | 175 | 223 | film destroyed |
| Tensile after 2 wks. at 95% RH, 70° C. | | 2849 | 3255 | film destroyed |

Examples 3, 5 and 6 demonstrate outstanding hydrolytic stability when compared to an aqueous polyurethane dispersion based on a polyester polyol.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous dispersion of a polyurethane containing hydantoin groups (calculated as $C_3N_2O_2$, MW 96) in an amount of 1 TO 40% by weight, based on resin solids.

2. The dispersion of claim 1 wherein said polyurethane contains 10 to 120 milliequivalents per 100 grams of polyurethane of chemically incorporated anionic groups and up to 10% by weight, based on the weight of said polyurethane, of lateral and/or terminal hydrophilic chains containing ethylene oxide units.

3. The dispersion of claim 2 wherein at least about 80% of said anionic groups are carboxylate groups neutralized with tertiary amines.

4. An aqueous polyurethane dispersion wherein the polyurethane contains 1 to 40% by weight, based on the weight of the polyurethane, of hydantoin groups (calculated as $C_3N_2O_2$, MW 96) and wherein the polyurethane is based on the reaction product of a) an NCO prepolymer containing 1 to 40% by weight, based on the weight of said polyurethane, of hydantoin groups (calculated as $C_3N_2O_2$, MW 96) with b) an isocyanate-reactive component containing am ino groups.

5. The dispersion of claim 4 wherein said polyurethane contains 10 to 120 milliequivalents per 100 grams of polyurethane of chemically incorporated anionic groups and up to about 10% by weight, based on the weight of said polyurethane, of lateral and/or terminal hydrophilic chains containing ethylene oxide units.

6. The dispersion of claim 5 wherein at least about 80% of said anionic groups are carboxylate groups neutralized with tertiary amines.

* * * * *